(12) United States Patent
Romrell et al.

(10) Patent No.: US 7,898,953 B2
(45) Date of Patent: Mar. 1, 2011

(54) DEFICIT AND GROUP ROUND ROBIN SCHEDULING FOR EFFICIENT NETWORK TRAFFIC MANAGEMENT

(75) Inventors: David Romrell, Hillsboro, OR (US); Christopher Charles Ptacek, Beaverton, OR (US)

(73) Assignee: Barracuda Networks Inc, Campbell, CA (US)

( * ) Notice: Subject to any disclaimer, the term of this patent is extended or adjusted under 35 U.S.C. 154(b) by 123 days.

(21) Appl. No.: 12/466,387

(22) Filed: May 15, 2009

(65) Prior Publication Data

US 2009/0285219 A1     Nov. 19, 2009

Related U.S. Application Data

(62) Division of application No. 11/404,049, filed on Apr. 13, 2006.

(51) Int. Cl.
    *G08C 15/00* (2006.01)
(52) U.S. Cl. ......................... 370/232; 370/235
(58) Field of Classification Search ............ 370/231, 370/232, 235
    See application file for complete search history.

(56) References Cited

U.S. PATENT DOCUMENTS

| | | | |
|---|---|---|---|
| 7,336,665 B1 * | 2/2008 | Ginjpalli et al. | 370/395.41 |
| 7,382,787 B1 * | 6/2008 | Barnes et al. | 370/401 |
| 7,583,678 B1 * | 9/2009 | Levy et al. | 370/395.4 |
| 2005/0195843 A1 * | 9/2005 | Ahmed et al. | 370/411 |
| 2006/0114912 A1 * | 6/2006 | Kwan et al. | 370/395.4 |
| 2007/0223504 A1 * | 9/2007 | Jain et al. | 370/412 |

OTHER PUBLICATIONS

Caprita, Bogdan, "Group Ratio Round-Robin: 0(1) Proportional Share Scheduling for Uniprocessor and Multiprocessor Systems", ATEC '05 Proceddings of the annual conference on USENIX Annual Technical Conference, 2005, pp. 1-17.*
Caprita, Bogdan, "Group Round Robin: Improving the Fairness and Complexity of Packet Scheduling," ANCS '05, Oct. 26, 2005, pp. 29-40.*

* cited by examiner

*Primary Examiner* — Dang T Ton
*Assistant Examiner* — Ryan C. Kavleski
(74) *Attorney, Agent, or Firm* — Patentry

(57) ABSTRACT

Data traffic is scheduled by, in a first scheduler, selecting a source of traffic from a plurality of sources of traffic, each source being associated with a second scheduler, in a second scheduler associated with the selected source of traffic, selecting a type of traffic from a plurality of types of traffic within the source selected by the first scheduler, and transmitting data of the selected type and source. Scheduling data traffic apparatus and method using deficit and group ratio round robin budgeting.

9 Claims, 7 Drawing Sheets

DEFICIT AND GROUP ROUND ROBIN SCHEDULING FOR EFFICIENT NETWORK TRAFFIC MANAGEMENT

CROSS-REFERENCE TO RELATED APPLICATIONS

This is a division of application Ser. No. 11/404,049, Filed 2006 Apr. 13.

BACKGROUND

In operating a network, it is sometimes necessary to control the flow of data from one point to another. This is especially true in complex network topologies, such as a tiered structure as shown in FIG. 1, with a central site 102d and several layers of sub-networks 102a, b, 112a, b each going through one or more links to reach the central site 102d. Previous systems for managing network traffic have relied on class based queuing (CBQ) or other scheduling systems to implement link level scheduling, that is, scheduling which of several links can send network traffic over an uplink to another tier of the network. Other systems have used data compression, requiring modifications to the systems at either end of a compressed link. Issues in scheduling network traffic include link oversubscription, where the various links into a node have a higher total traffic than the link out of the node to another part of the network, guaranteeing bandwidth amounts to various links and various classes of data traffic, and compensating for the effects of compression on allocation of bandwidth.

SUMMARY

In general, in one aspect, data traffic is scheduled by, in a first scheduler, selecting a source of traffic from a plurality of sources of traffic, each source being associated with a second scheduler, in a second scheduler associated with the selected source of traffic, selecting a type of traffic from a plurality of types of traffic within the source selected by the first scheduler, and transmitting data of the selected type and source.

Implementations include one or more of the following. Repeating the selecting and transmitting. The traffic is traffic for passing over a communications link. The selecting includes scheduling the selection of sources and types according to characteristics of the communications link. Selecting a source of traffic includes selecting a source from which packets should be delivered according to a rule. Delivering packets according to the rule includes one or more of guaranteeing a minimum bandwidth for a source of the plurality of sources, guaranteeing a maximum burst limit for a source of the plurality of sources, and guaranteeing a service interval to a source of the plurality of sources. Choosing a source of traffic includes allowing a user to configure a preemptive priority for a type of traffic. In the first scheduler, accounting for bandwidth used by each source of traffic. Selecting a type of traffic includes selecting a type from which packets should be delivered according to a rule. Delivering packets according to the rule includes one or more of guaranteeing a minimum bandwidth to a type, within an amount of bandwidth allocated by the first scheduler, guaranteeing a maximum burst limit to a type, within a burst limit allocated by the first scheduler, and guaranteeing a service interval to a type. The types of traffic include overlapping classifications of traffic. Before the selecting, filtering the traffic based on routes the traffic will use. The filtering includes applying a radix tree algorithm. Determining that a packet from the selected type is to be transmitted through a tunnel, and selecting a type includes charging the type for bandwidth usage based on an average efficiency of the tunnel.

In general, in one aspect, data traffic is scheduled by selecting a source of traffic from a plurality of sources of traffic using a group ratio round robin scheduling algorithm.

Implementations may include one or more of the following features. Using a group ratio round robin scheduling algorithm includes defining an ordered set of groups of sources of traffic having similar weights, computing ratios between total weights of the groups, repeatedly, choosing one of the groups, within the chosen group, using a second algorithm to choose a source of traffic, transmitting an amount of traffic from the chosen source. The second algorithm is a deficit round robin scheduling algorithm. Computing a credit for each group based on the ratios, and after the transmitting, updating a deficit counter and a quantum counter for the chosen group based on the amount of traffic transmitted and the credit. Choosing one of the groups by, if the deficit counter and the quantum counter of the last-chosen group are above zero, choosing the last-chosen group, if the deficit counter of the last-chosen group is at or below zero, adding the credit to the deficit counter, adding a quantum to the quantum counter, and choosing the next group of the ordered set of groups, and if the deficit counter of the last-chosen group is above zero and the quantum counter is at or below zero, adding a quantum to the quantum counter for that group, and choosing the first group in the ordered set of groups.

Implementations may include a centralized server performing the identifying and recording.

Advantages include the following. Bandwidth can be guaranteed to each branch in an oversubscribed network with thousands of links. The bandwidth that a particular application or class of applications uses can be controlled to be within a specified range.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
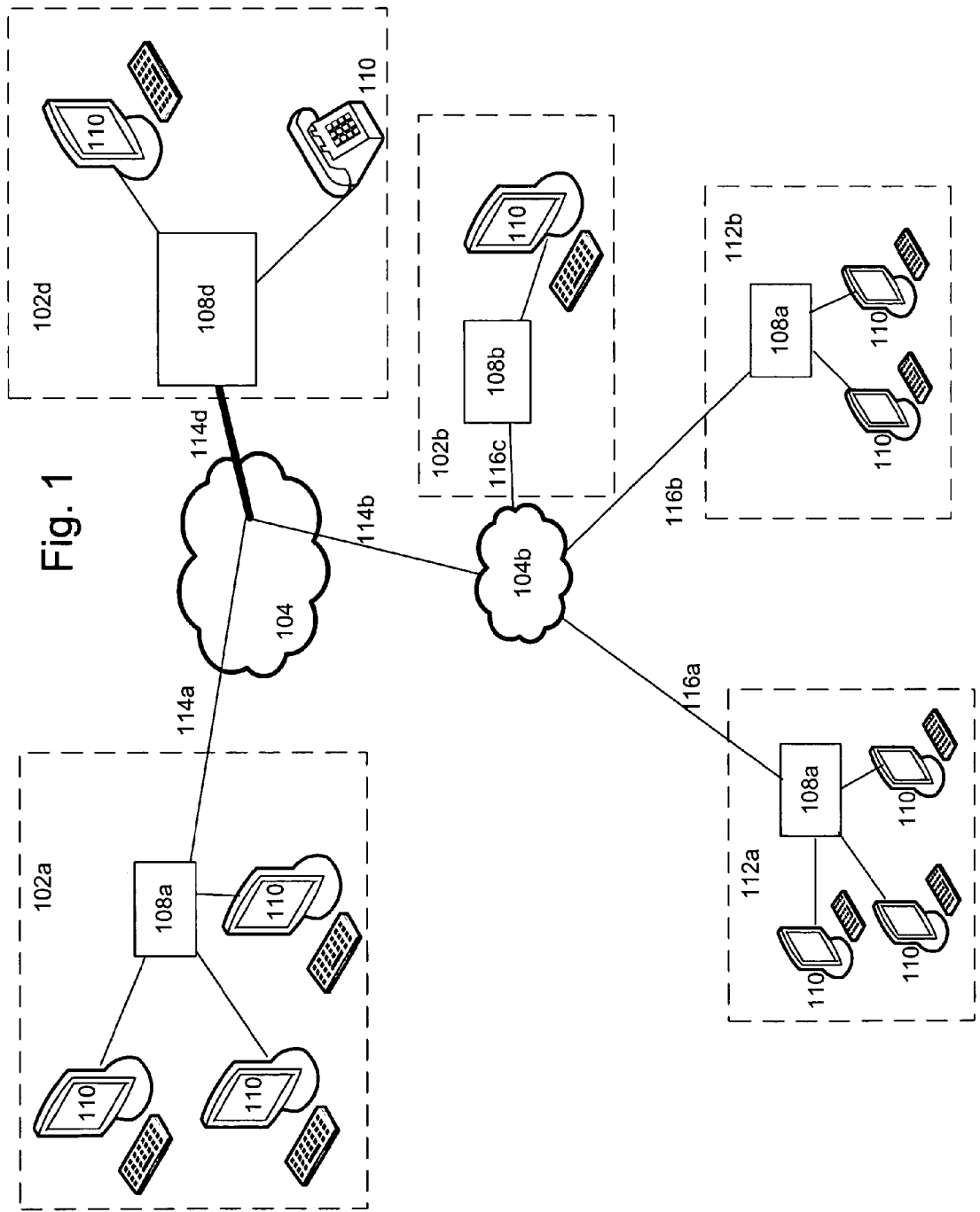
FIGS. 1 and 2 are block diagrams of a network.

In a central site network, such as that shown in FIG. 1, multiple remote sites 102a, b and a central site 102d each have a single connection 114a, b, d, referred to as a link, through a network 104, such as the Internet or a private IP network. Each site has network hardware 108a, b, d, which facilitates connections between devices 110 and the network links 114a, b, d, respectively. The remote sites 102a, b may also have links 116a, b to additional remote sites 112a, b connected through another network 104b. In such a case, the link to the local network hardware is shown as another link 116c, sharing the link 114b back to the central site 102d with the other remote links 116a, b. Connections between endpoints on the network are referred to as links, which may differ from actual network connections. Link 114d connecting the central site to the network may be a larger capacity link than the remote site links 114a, b which feed in to it, or it may be the same or even smaller capacity. Similarly, link 114b could have a higher or lower capacity than the sum of remote links 116a-c.

Figure 2:
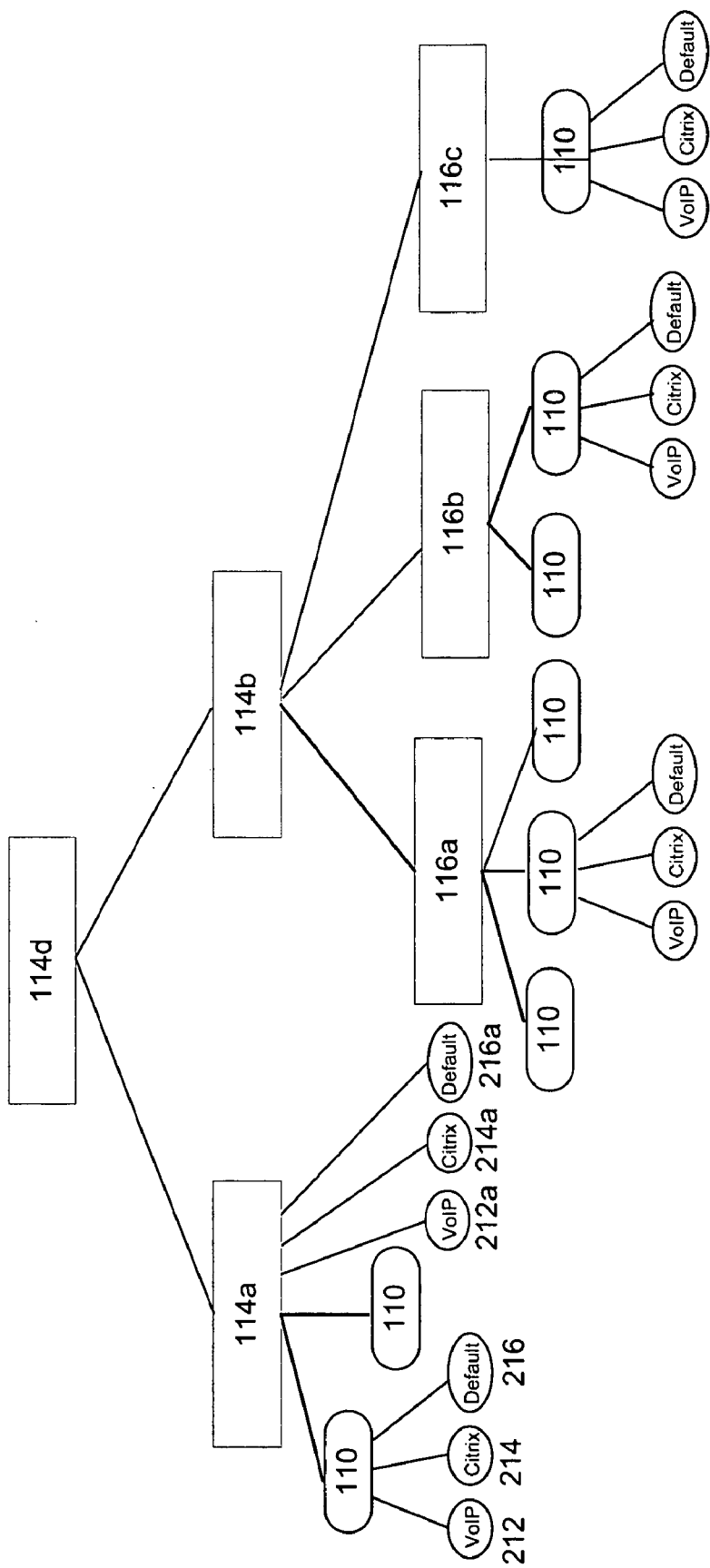

Another depiction of a network is shown in FIG. 2. Viewed this way, central site link 114d is at the top of the hierarchy. The two remote site links 114a, b are represented by the first level rectangular boxes while local systems 110 at each remote site are represented by rounded boxes. Second level links 116a, b to the more remote sites 112a, b are connected through remote site link 114b. Classes of data traffic originating from the various systems 110 are represented by ovals, e.g., classes 212 for VoIP traffic, 214 for Citrix traffic, and 216 for all other network traffic. Classes are sometimes shown directly feeding into a link, rather than coming through a system 110, e.g. classes 212a, 214a, 216a connected to link 114a. At each level of the hierarchy, a link that represents several links at the next level down is referred to as a link group. For example, the link 114b is a link group that carries traffic from the links 116a and 116b from the remote sites 112a and 112b to the central site 102d via link 114d, as well as traffic on link 116c from the system 110 local to site 102b.

Each link may have a minimum guaranteed bandwidth, that is, the network is configured to assure that the capacity on link 114d associated with traffic for other links 114a, b, 116a, b, c is allocated at least to a minimum configured rate for that link. Links may also be configured with an allowable burst limit, that is, a maximum rate of traffic that the link can generate at any one time. Link oversubscription occurs when the total bandwidth available or used by a set of links into a system or site exceeds the bandwidth available on that site's link to the next level of the network hierarchy. For example, if each of links 116a, b could allow 1 Mb/s, but the outgoing link 114b could only provide 1.5 Mb/s, the link 114b would be oversubscribed. With inadequate scheduling, one link may use too great a portion of the available uplink bandwidth, preventing another link from achieving its guaranteed minimum rate. Conversely, if the upstream link has a larger capacity than all the downstream links, e.g., if link 114d had a capacity of 10 Mb/s in the previous example, it could carry too much traffic and overwhelm the downstream links 114a, b to the remote sites 102a, b. The same problems are present in routing traffic on remote site link 114b to and from second-level links 116a, b. A link scheduler manages the traffic over each link to prevent oversubscription or overflowing of links. Such a scheduler determines which downstream link's traffic shall be carried by the upstream link (in either direction) at any particular time according to a link scheduling algorithm. A single central site scheduler, e.g., at device 108d, may operate at the top level of the network, modeling bottlenecks at all levels of the network to assure that link scheduling at each level is compatible with each other level. For example, a central site scheduler will not send more traffic over link 114d that is ultimately destined for links 116a and 116b than those links can handle, even if intermediate link 114b could handle that much incoming traffic.

In addition to actual connections between devices, different classes of network traffic may have different guaranteed minimum rates and burst limits. For example, VoIP traffic 212 may have a higher minimum and a lower burst rate than Citrix traffic 214 or regular network traffic 216. For traffic within a link, a class scheduler determines which actual data packets to transmit, based on their class and a class scheduling algorithm. A single scheduler or set of schedulers could be implemented at a high level of the hierarchy, and their scheduling determinations cascaded down to the classes of traffic at each remote site. As with link scheduling, class schedulers operate on traffic flowing in either direction. In some examples, certain classes may have preemptive priority, in which case they not only take priority within their link, but the link itself is temporarily given priority over other links to assure packets for that class are quickly transmitted. As the preemptive class and link are satisfied the scheduler updates normal usage counters for the class and link scheduling algorithms.

Figure 3:
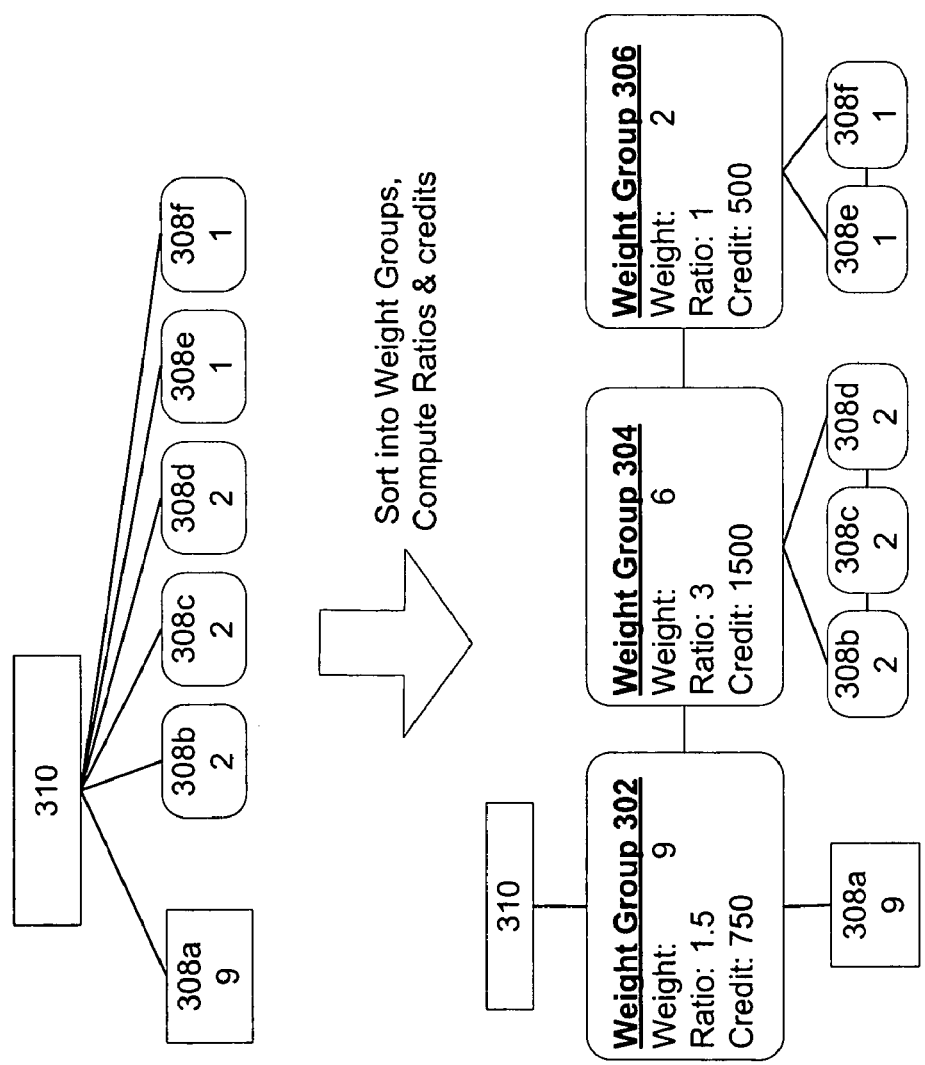
FIG. 3 is a block diagram of a scheduling algorithm.

In some examples, as shown in FIG. 3, a link scheduler uses a group ratio round robin (GRRR) algorithm to determine what order to schedule the links in. Link group 310 represents lower-level links 308a-f, each with a different weight based on a guaranteed or actual rate. The GRRR algorithm uses "weight groups" 302, 304, 306 to group together links 308a-f that have similar weights. A list is maintained of a small number of groups 302, 304, 306 of links 308a-f having similar weights. For example, the link group 308a is in a group 302 of its own because it has a weight of nine. The links 308b-c are in a second group 306 because they have the same weight, two. The links 308e-f likewise form a group 306 of links with weight one. The groups 302, 304, 306 then have total weights of 9, 6, and 2 for relative ratios of 1.5 (9:6), 3 (6:2), and 1, respectively.

Groups are selected to transmit packets based on the ratio of bandwidth needed by one group to the bandwidth needed by each other group. Each group transmits an amount of data determined by the algorithm in turn. Within each group, individual links are selected to transmit packets based on the deficit round robin (DRR) algorithm, in which individual links are selected based on the ratio of their traffic volume to that of the other links in the group.

The GRRR algorithm, as adapted to link scheduling, proceeds as follows, within the example of FIG. 3. A simple weighted round robin algorithm would schedule links 308a-f as AAAAAAAAABBCCDDEF (where letters A-F correspond to links 308a-f). While this provides overall fair bandwidth sharing, it does not provide optimal service latency. To be specific, the link group 308a will get bursts of congestion that cause queuing and possibly sustained packet loss. The other links get jitter because they wait for 308a to exhaust its weighted portion of link group 310.

The GRRR approach resolves this by spreading weights over an entire service frame. In the example above it will schedule these as: AABAACAADEAABAACAADF. To achieve this, each link or link group is sorted into weight groups 302, 304, 306 with other peers that have weights within the same factor of 2 (e.g., rates between 2 k to 2 k+1−1). The weight groups are then sorted based on their total weight (i.e., the sum of the weights of the included links and link groups). Then the ratio of the weight from one group to the next is calculated, and a credit is assigned based on the ratios.

A pointer is kept on the current weight group being serviced. Credits and counters are used to maintain the ratios between the weight groups. A deficit counter is used to determine when to move to the next weight group. A quantum counter is used to determine when the current weight group ratio is satisfied and move the process back to the start. On the next invocation of the scheduler, that weight group is serviced and the counters are decreased by the amount of data sent. In some examples, the quantum is defined as a power of 2 (e.g., 1024 bytes) to simplify ratios by using a shift operation.

The scheduler moves the pointer between weight groups using the following ordered rules after servicing the current weight group:

1. If the deficit and quantum counters are both above zero, then the pointer stays with current weight group.

2. If the deficit is at or below zero, then the deficit credit is added to the deficit counter and the quantum credit is added to the quantum counter and then the pointer moves to next weight group.

3. If only the quantum is at or below zero, then the quantum credit is added to the quantum counter and the pointer moves to (or remains at) the first weight group.

Because items within a group have weights within a power of 2 of each other, the scheduler can use simple deficit round robin within each weight group and still maintain good fair service latency. Table 1 demonstrates each step for the above process (for simplicity, a quantum size of 500 is used with simple packet sizes). In each step, the highlighted group transmits a variable number of bytes and the new deficit is shown in the Def+ column. The current quantum amount and quantum deficit are shown in the Qu and Qu+ columns, respectively. The two rules above are repeatedly followed as the process moves from one row to the next. This results in the schedule identified above.

TABLE-US-00001 TABLE 1 Weight Group 302 Weight Group 304 Weight Group 306 Clients: A=9 Clients: B=2, C=2, D=2 Clients: E=1, F=1 Weight: 9 Weight: 6 Weight: 2 Ratio: 1.5 Ratio: 3 Ratio: 1 Credit: 750 Credit: 1500 Credit: 500 slot Def Def+ Sent Def Def+ Qu Qu+ Sent Def Def+ Qu Qu+ Sent 750 A 1500 500 B 500 500 E 1 750-50 A 800 1500 500 B 500 500 E 2 700 A 1500 1100 500 100 B 400 500 500 E 3 700 A 1100 600 100-400 B 500 500 500 E 4 700 300 A 400 600 100 C 500 500 E 5 300-400 A 700 600 100 C 500 500 E 6 350 A 600 100 100-400 C 500 500 500 E 7 350-450 A 800 100 100 D 500 500 E 8 300 A 100-400 100-400 D 500 500 500 E 9 300 A 1100 100 B 500 0 500 0 E 500 10 300-300 A 600 1100 100 B 500 500 F 11 450 A 1100 1000 100 0 B 100 500 500 F 12 450-250 A 700 1000 500 C 500 500 F 13 500 A 1000 500 500 0 C 500 500 500 F 14 500 0 A 500 500 500 D 500 500 F 15 750 A 500 0 500 0 D 500 500 500 F 16 750 A 1500 500 B 500 300 500 300 F 200 17 750 A 1500 500 B 300 0 300 0 F 300

In some examples, a network includes thousands of links, but there will generally only be 3-8 weight groups. In most cases, most of the links will have similar rates (e.g., a typical network may have 400 links at 256 kb/s, 500 links at 512 kb/s, 8 links at 1.5 Mb/s, and 2 links at 3 Mb/s). Since weight groups are defined as weights within a power of 2, there are a maximum of 32 groups possible to cover all link types between 1 b/s ($2^0$) and 2 Gb/s ($2^{31}$). In other words, adding the GRRR mechanism to a link scheduler requires minimal memory overhead, as it requires minimal processing time while providing a very good ability to guarantee rates and fair service latency. Such a link scheduler is referred to as order $O(1)$, meaning that the amount of computation necessary to operate it is substantially insensitive to the number of links being scheduled. The original GRRR algorithms were designed for process scheduling, and assume work units of fixed size, an assumption that is not necessarily true for packet schedulers.

By adding deficits as described above, each group has the ability to exceed its ratio during one transmission (e.g., the deficit of −50 in step 1) but this will decrease the volume of data that group can send by that amount the next time it comes to be serviced. This error is bounded by the maximum packet size or quantum size (whichever of the two is smaller) per service interval.

The variable size of packets is also the reason for the addition of the "quantum" measurements into the weighted group scheduler. This ensures that groups sending small packets will still get their fair ratio of bandwidth. As a weight group is serviced, the scheduler maintains the quantum deficit to assure the previous weight group ratio is satisfied. When the algorithm is moved to a new weight group, it is recharged with a new quantum (e.g., another 500 bytes is added). Any excess or surplus is taken into account during the next quantum (i.e., it is slightly less then it would normally be). The size 500 was used for simplicity of illustration. A size of 1024 is often used and is significant because it allows for efficient multiplication and division (by a simple bitwise shift left or right). This calculation of transition credits when weight groups are created or adjusted accounts for links becoming active/idle. In some examples, a quantum of 1024 bytes provides a good point in tuning the performance of the scheduler between efficiency and precision. A smaller quantum (e.g., 512 bytes) may have less error because it finds the best group to service next. This can help ensure the best service interval for links with small packet sizes (e.g., mostly voice or MTU limited traffic). However, this may come at the expense of efficiency in looping through groups until the quantum is large enough for one to send. Other $O(1)$ packet schedulers use a quantum of the maximum packet size (e.g., 1600 bytes). The error introduced from the quantum is bounded to be less then a quantum difference per service interval.

In some examples, the GRRR algorithm assumes that all links within each weight group are active. If a group contains idle or over-limit links then the unused bandwidth from each such link would be given up by that link for the current service frame. It does this by assuming it did its DRR credit amount of work. The work is updated in both the DRR and GRRR deficits and the algorithm continues as if it was actual work done. This efficiently distributes the idle work done across all links and link groups. Each weight group maintains a list of active links and idle links. As a first packet is queued into an idle link, the link is moved to the tail of a DRR list and the weight is increased for the weight group. If not already set, then a pointer is set to the current location in the DRR list. Despite becoming active, the deficits are still tracked from before (i.e., they are not reset). This ensures that links that oscillate from active to inactive are not allowed to cheat at bandwidth. As the scheduler exhausts a link, (removes the last packet) it continues to leave it in the DRR until the next round. As the scheduler visits a link that is still exhausted on a second pass, it will then remove it from the DRR active list and put it into the idle list. It will also update the total weight of the weight group.

At the end of the service frame, the scheduler recalculates the ratios and credits for the effected groups. If the group does not shift in its sorted location then only the credit for the current group and the one that has larger weight needs to be updated. In some cases the order of the list may change because the adjusted weights for this group cause it to exceed the total weight of group in front of or behind it in the original list. In this case the credit needs to be updated on three groups (the two listed in the previous paragraph, plus the one above the previous location since its ratio is now to the group that had been behind us).

In some examples, this algorithm is performed even less frequently (i.e., every N times through the DRR cycle, or for multiple GRRR frames). On average the penalty for a delay before increasing the credit for new activation should be balanced by a similar delay before decreasing credit for idle link removal. The effect of a slightly low credit is a missed frame for the group but the per-item error is distributed between the items so they only loose a bit on the service latency. Conversely, when the credit is slightly high, the group may be given an extra slot in the frame, and this is also distributed as a slight boost to the service latency per link.

In some cases a weight group will only have one or two links within it. If those links go idle then the entire weight group should not take any slots from the frame. To do this the weight group is flagged as idle and will give up its slot by crediting either its quantum or next weight group credit (whichever is smaller). This maintains the ratio of work done with other weight groups. At the end of the frame this weight group is removed. The ratios and credits from the group in front of where it had resided are recalculated. When the link within the weight group becomes activated again, the weight group is moved back into the correct location and adjusts the ratios/credits for the group in front of it and for itself.

The above examples were of a single link group. This will be typical of most branch policies that will have root level link group with one or two links (e.g., a link to headquarters and a link to the Internet). In some examples, like that shown in FIG. 2, there are policies that can have nested link groups in a hierarchy (below 114b). As shown in the above example, the link group 308a was given a fractional guarantee in the same way that links are given fraction guarantee. Within this link group, the central scheduler adds another GRRR scheduler to manage all of its children. The schedulers are run independently of each other but ensure precise service intervals for all items within the overall scheduler.

The weight groups and DRR algorithms provide fair bandwidth sharing and fair service latency based on guarantees. However, it has no concept of rate limiting which is a requirement, in some implementations, to represent the physical capacity of a link (so as not to exceed its rate, causing congestion). The rate limiting is done in a similar manner to class based queuing (CBQ). Each link and link group object is calculated to have an average time spent per byte for when it is running at its limit. Using this the scheduler tracks the next time to send, and an "average idle time" variable tracks the variance with the actual next time data is sent. If the next time is past (or not set) then the link or link group is not rate limited and can send. Otherwise, it has exceeded its rate and is skipped.

Within a selected link, a class scheduler is used to determine which data packets actually get transmitted over the link. Packets may be classified based on the application that generated them, priorities assigned by an application, or other factors. CBQ is one algorithm for scheduling traffic based on class. In CBQ, packets are scheduled according to relative priorities based on the type of data represented. For example, VoIP data needs low latency, while regular IP traffic can tolerate reduced latency but may require higher accuracy. In such an example, VoIP packets would be scheduled to be transmitted frequently and promptly, but not in large clusters. This sort of scheduling is greater than order $O(1)$, meaning that the amount of computation necessary to operate a scheduler varies linearly with the number of classes, which may not be manageable for large networks.

Figure 4:
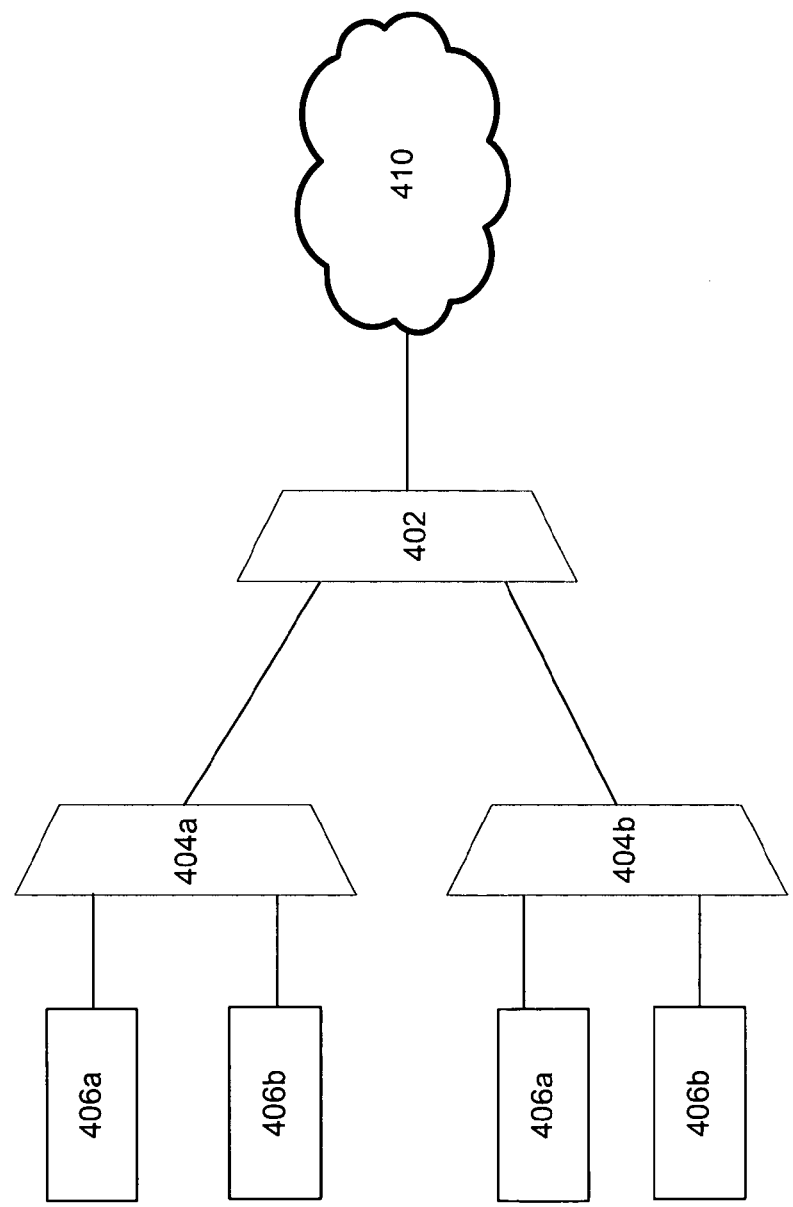
FIGS. 4, 5, 6 and 7 are block diagrams of schedulers.
Figure 5:
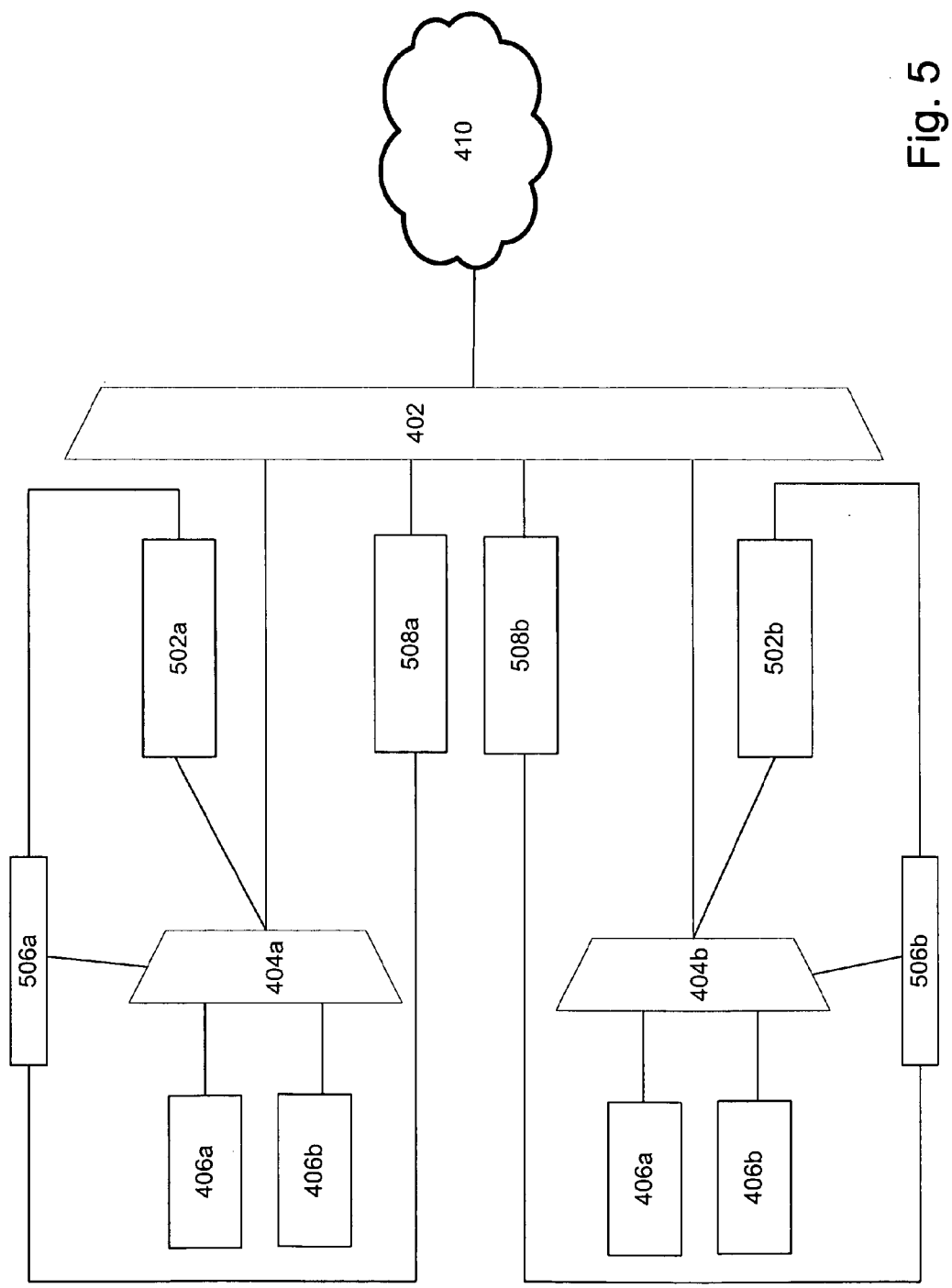

Link-based scheduling and class-based scheduling can be combined as shown in FIG. 4 to achieve benefits of each without requiring burdensome amounts computation resources. A link scheduler 402 is used to select which link to allocate capacity to, but doesn't actually queue traffic to be transmitted. Rather, it simply selects which class scheduler 404a, b (there being one for each link) to take traffic from. The selected class scheduler 404a or 404b then selects packets from classes 406a, b and delivers them to the link scheduler to be transmitted. The link scheduler transmits packets provided by the class schedulers into the network 410, for example, by sending them to a network interface of the machine on which the scheduler is operating. This process may be repeated at each stage of a hierarchical network like that shown in FIG. 2, or may be done centrally and communicated to the responsible hardware at each site.

Figure 6:
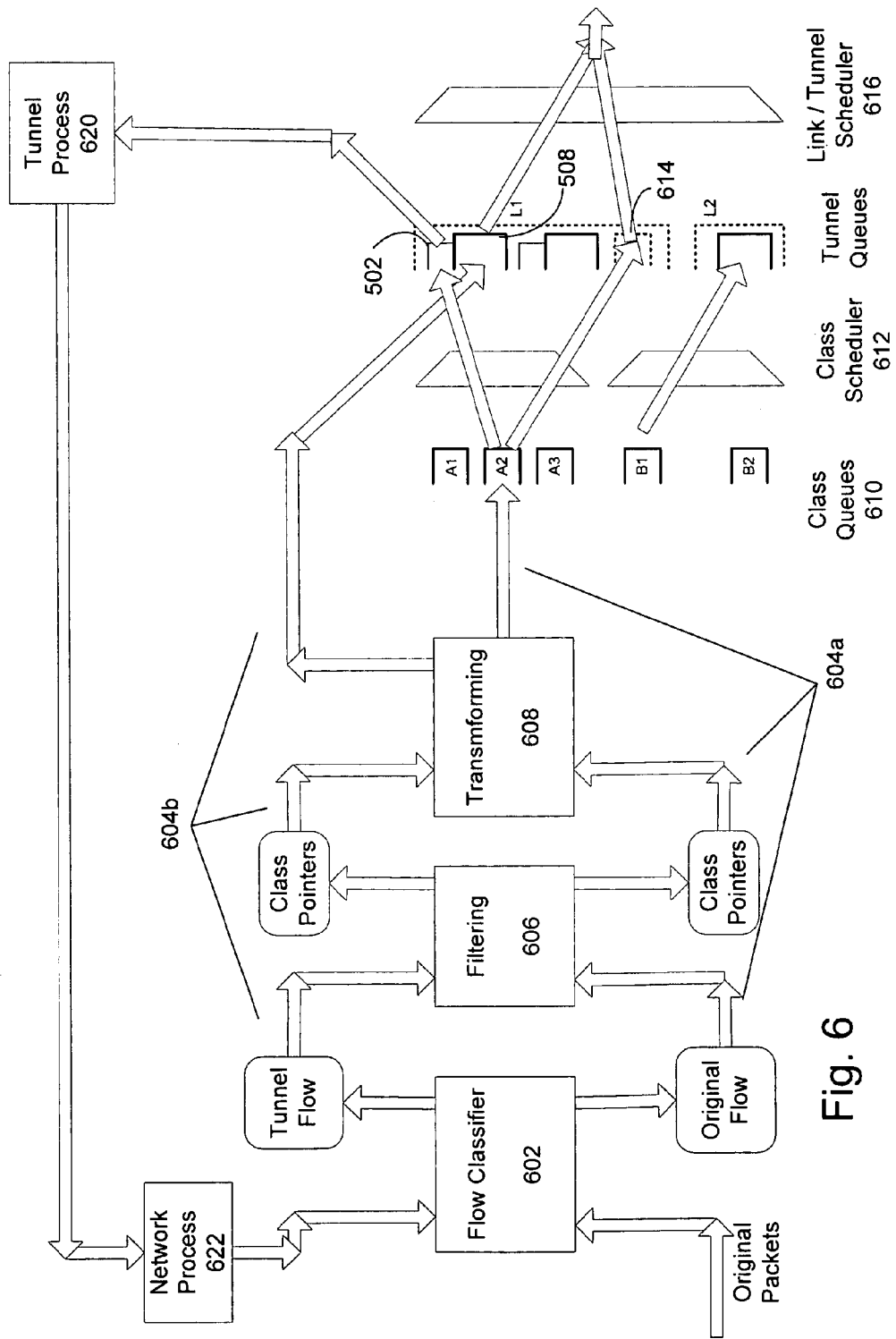
Figure 7:
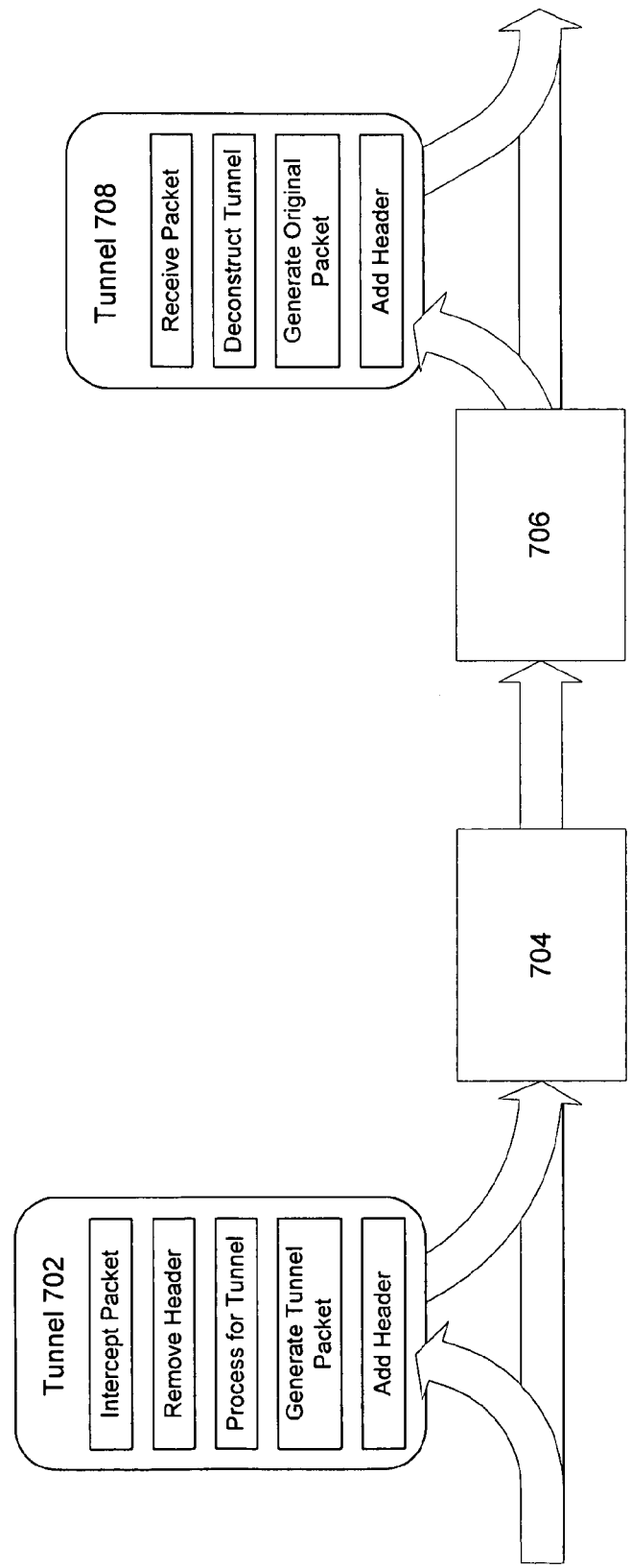

The typical packet filter to determine the class queue for a packet can be based on many packet attributes (address, port, type of service, packet flags, etc). However, mixing these filtering attributes allows filters to overlap so they are stored and searched in precedence order, which is $O(N)$. On networks containing hundreds or thousands of links with many classes per link this is not generally scalable. The packet filtering shown in 606 of FIG. 6 uses a route based pre-filtering based on the link subnet definition to determine the link a packet will use. This pre-filtering can use routing algorithms like radix tree to allow an $O(\log(N))$ search. A link only has a few classes, so within the link a normal $O(N)$ precedence search can be done on rules to select the class a packet within the link should use. The class and link determination is then cached as part of a flow table, as disclosed in U.S. Pat. No. 7,010,611, which is incorporated here by reference, so when scheduling future packets the scheduler can do a quick hash to find flow and the previous class and link determination. In some cases this allows $O(1)$ class and link determination.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of embodiments of the invention have been described. Nevertheless, it will be understood that various modifications may be made without departing from the spirit and scope of the invention. For example, other network topologies may be used. Accordingly, other embodiments are within the scope of the following claims.

The invention claimed is:

1. A link scheduler apparatus to determine an order to schedule links comprising:
   a processor configured by computer instructions encoded onto a non-transitory tangible mass storage device to: group together links that have similar weights, and
   maintain a list of groups of links having similar weights based on a guaranteed or actual rate;
   select a group to transmit packets based on the ratio of bandwidth needed by each group to the bandwidth needed by every other group whereby each group transmits an amount of data in turn, and
   within each group, select an individual link to transmit packets based on the ratio of its traffic volume to that of the other links in the selected group;
   another scheduler to manage all of its children wherein the schedulers are run independently of each other but ensure precise service intervals for all items within the overall scheduler wherein each scheduler is a process of the processor; and
   an other processor for rate limitation to represent the physical capacity of a link wherein the processor is configured by computer instructions encoded onto the non-transitory tangible mass storage device to:
   calculate an average time spent per byte for each link and link group object when it is running at its limit,
   track the next time to send, and an "average idle time" variable,
   track the variance with the actual next time data is sent,
   send if the next time is past (or not set) because the link or link group is not rate limited, and
   skip if the link or link group has exceeded its rate.

2. A link scheduler apparatus to determine an order to schedule links comprising:
   a processor configured by a software program to group together links that have similar weights, and maintain a list of groups of links having similar weights based on a guaranteed or actual rate;
   a pointer to contain a current weight group being serviced;
   a quantum counter to determine when a current weight group ratio is satisfied and move the pointer back to the start of the list, wherein on a next invocation of the scheduler, that weight group is serviced and the quantum counter is decreased by an amount of data sent; and
   a deficit counter to determine when to move to a next weight group, said deficit counter to enable each group to exceed its ratio during one transmission but to decrease a volume of data that group can send by that amount the next time it comes to be serviced, bounded by the smaller of maximum packet size or quantum size per service interval.

3. The apparatus of claim 2 further comprising the processor to move the pointer between weight groups by application of the following ordered rules after servicing the current weight group:
   1, if the deficit and quantum counters are both above zero, then the pointer stays with current weight group;
   2, if the deficit is at or below zero,
   add the deficit credit to the deficit counter, add the quantum credit to the quantum counter, and move the pointer to next weight group;
   3, if only the quantum is at or below zero, then add the quantum credit to the quantum counter and set the pointer to the first weight group.

4. The apparatus of claim 2 wherein the number of weight groups is between three and eight wherein
   weight groups are defined as weights within a power of 2, thereby providing a maximum of 32 groups possible to cover all link types between 1 b/s (2.sup.0) and 2 Gb/s (2.sup.31).

5. The apparatus of claim 2 further comprising the processor further configured by computer instructions encoded onto the non-transitory tangible mass storage device to:
   recalculate the ratios and credits for the affected groups periodically,
   if the group does not shift in its sorted location then only the credit for the current group and the one that has larger weight needs to be updated,
   if the adjusted weights for a group cause it to exceed the total weight of group in front of or behind it in the original list,
   update the credit on three groups: the current group, the group that has larger weight, and the group above the previous location.

6. The apparatus of claim 5 wherein periodically is at the end of each Nth service frame wherein N is an integer variable under algorithmic or manual control.

7. The apparatus of claim 2 further comprising a management processor for idle link management wherein the management processor is configured by computer instructions encoded onto the non-transitory tangible mass storage device to:
   on the condition every link within a weight group is flagged as idle and will give up its slot:
   credit the smaller of its quantum or next weight group credit, remove this weight group at the end of the frame, recalculate the ratios and credits from the group in front of where it had resided,
   on the condition of any link within a weight group flagged as idle becomes active:
   move the weight group back into the correct location, and adjust the ratios/credits for the group and its preceding group.

8. The apparatus of claim 2 for nested link groups in a hierarchy further comprising an other scheduler to manage all of its children wherein the schedulers are run independently of each other but ensure precise service intervals for all items within the overall scheduler wherein the other scheduler is a process of the processor.

9. The apparatus of claim 2 further comprising a rate limiting processor for rate limitation to represent the physical capacity of a link wherein the rate limiting processor is configured by computer instructions encoded onto the non-transitory tangible mass storage device to:
   calculate an average time spent per byte for each link and link group object when it is running at its limit, track the next time to send, and an "average idle time" variable, track the variance with the actual next time data is sent, send if the next time is past or not set because the link or link group is not rate limited, and skip if the link or link group has exceeded its rate.

* * * * *